US011117556B2

(12) United States Patent
Fry et al.

(10) Patent No.: US 11,117,556 B2
(45) Date of Patent: Sep. 14, 2021

(54) TRAILER POWER AND COMMUNICATION MANAGEMENT

(71) Applicant: KNORR-BREMSE SYSTEME FUER NUTZFAHRZEUGE GMBH, Munich (DE)

(72) Inventors: Matthew Fry, Wraxall (GB); Martin Mederer, Neumarkt (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 129 days.

(21) Appl. No.: 16/340,184

(22) PCT Filed: Oct. 10, 2017

(86) PCT No.: PCT/EP2017/075822
§ 371 (c)(1),
(2) Date: Apr. 8, 2019

(87) PCT Pub. No.: WO2018/069326
PCT Pub. Date: Apr. 19, 2018

(65) Prior Publication Data
US 2019/0308594 A1 Oct. 10, 2019

(30) Foreign Application Priority Data
Oct. 10, 2016 (GB) ...................... 1617211

(51) Int. Cl.
*B60T 7/22* (2006.01)
*B60R 16/023* (2006.01)
(Continued)

(52) U.S. Cl.
CPC ............. *B60T 7/22* (2013.01); *B60R 16/023* (2013.01); *B60T 13/66* (2013.01); *B60W 40/02* (2013.01);
(Continued)

(58) Field of Classification Search
None
See application file for complete search history.

(56) References Cited

U.S. PATENT DOCUMENTS 9,315,173 B1 * 4/2016 Gray .......................... B60T 7/06
9,738,125 B1 * 8/2017 Brickley .................. B60D 1/26
(Continued)

FOREIGN PATENT DOCUMENTS

EP 2228239 A1 9/2010
EP 2563606 B1 3/2013
(Continued)

OTHER PUBLICATIONS

International Search Report dated Apr. 11, 2018, of the corresponding International Application PCT/EP2017/075822 filed Oct. 10, 2017.

*Primary Examiner* — Peter D Nolan
*Assistant Examiner* — Demetra R Smith-Stewart
(74) *Attorney, Agent, or Firm* — Norton Rose Fulbright US LLP; Gerard A. Messina

(57) ABSTRACT

A connector in a commercial vehicle electronic braking and communication system for a trailer to connect the system to a prime mover. The connector includes an electronic control module with a first databus connection, which databus, in use, carries braking related data signals and to which a brake pressure control device is attached and a second databus connection, which second databus, in use, carries data relating to non-braking functions.

17 Claims, 7 Drawing Sheets

(51) Int. Cl.
*B60W 40/02* (2006.01)
*B60T 13/66* (2006.01)
*G06F 13/38* (2006.01)

(52) U.S. Cl.
CPC .......... *G06F 13/38* (2013.01); *B60T 2201/02* (2013.01); *B60T 2210/32* (2013.01); *B60W 2554/00* (2020.02)

(56) References Cited

U.S. PATENT DOCUMENTS

| | | | |
|---|---|---|---|
| 2009/0120747 A1* | 5/2009 | Heise | B60T 8/1708 188/3 H |
| 2011/0257840 A1 | 10/2011 | Risse et al. | |
| 2011/0272916 A1* | 11/2011 | Risse | B60D 1/62 280/420 |
| 2012/0323443 A1* | 12/2012 | Risse | B60D 1/62 701/36 |
| 2014/0081544 A1* | 3/2014 | Fry | B60T 7/22 701/70 |
| 2016/0052453 A1* | 2/2016 | Nalepka | H04N 5/44 348/148 |
| 2018/0079395 A1* | 3/2018 | Cekola | B60T 7/08 |

FOREIGN PATENT DOCUMENTS

| | | | |
|---|---|---|---|
| EP | 2607196 A2 | 6/2013 | |
| GB | 2395241 A | 5/2004 | |
| GB | 2505949 A | 3/2014 | |
| GB | 2535527 A | 8/2016 | |

* cited by examiner

TRAILER POWER AND COMMUNICATION MANAGEMENT

SUMMARY OF THE INVENTION

The present invention therefore seeks to provide a more flexible and cost effective solution to the problems addressed by the known solutions.

BACKGROUND INFORMATION

Electronic braking systems for commercial vehicle trailers and other related applications are becoming increasingly complex as additional functionality is introduced. It is also a highly competitive, cost conscious market. Trailers do not generally possess any autonomous power supply and rely for power on a tractor vehicle. The trailer is provided with an autonomous brake system having an independently operable trailer brake control unit. The trailer electronic brake control unit enables the trailer to be equipped with stability control and greatly enhances the safety of the trailer.

The standard connection between a truck and trailer for braking and running gear is governed by ISO 7638 for 12V and 24V systems. The standard ISO 7638 connector is a 7 pin connector, in which pin 1 provides the power for the trailer brake control valves; pin 2 provides the power for the control electronics, pins 3 and 4 are the respective grounds for these pins; pin 5 is used for fault indication and pins 6 and 7 are used for CAN communication.

A back up electrical connection is optionally provided by the stop lamp supply which is available on the ISO1185 connector. The light control signals for the trailer are provided on the ISO1185 connector and ISO3731 connector. ISO 12098 defines a 15 way connector that is intended to replace the ISO1185 and ISO3731 connectors. The standard ISO12098 connector is a 15 pin connector, in which pin 7 provides the power for the stop lights, which is also used as a backup power supply for the braking system; pin 9 provides an optional power supply, pins 4 is ground for these pins; pins 14 and 15 are used for CAN communication with a separate ground on pin 13. ISO 12098 is not used for braking data or running gear signals, but rather all other signals, including but not limited to obstacle detection.

The ISO 7638 electrical connector comprises 5 wires with a cross-section of 1.5 mm$^2$ and 2 wires, on pins 1 and 2 with a cross section of 4 mm$^2$ or 6 mm$^2$. These cables are relatively expensive and due to the stiffness of the two power cables caused by the large cross sectional area are quite difficult to fit. As the trailer electronic braking system may be configured around the standards used in Europe, there are additional costs involved in adapting the electrical management of braking system for use in the US market where different standards are applied (J560). An additional limitation is that the safety critical braking and running gear data, which is defined by the ISO11992-2 standard, and legislation prevents its use for other functionality, furthermore in multi vehicle combinations the CAN bus load is very high, which limits the scope for additional functionality. An example of this approach is disclosed in EP2563606 which has a connection box which brake control signals from a towing vehicle (i.e. ISO11992-2 from ISO7638 connector) and light control signals (i.e. ISO11992-3 from ISO12098 connector). These signals are then put on a single trailer bus where they are passed to the trailer EBS, which controls the lights on the trailer. US2011/257840 discloses a similar system.

Additional functionality is most often introduced by including the function as an auxiliary function in the trailer EBS. GB 2395241 discusses an electronic control unit ECU having a nonvolatile storage memory for storing braking-related control parameters specific to the vehicle and a programmable storage to carry operating data for one or more auxiliary functions of the vehicle. Incoming and outgoing variables and control algorithms can then be checked against a predetermined list to safeguard the braking function against error modes.

It is also possible to provide an additional trailer electronic control co-located with the trailer EBS unit to provide an additional intelligence in the trailer braking system outside of the main trailer EBS control unit. This approach simply results in additional costs due to the additional control unit and also increases the installation cost and difficulty due to the additional cabling that is required. This approach has not been commercially successful. Although the additional functionality is not purely concerned with the act of braking but includes for example communication, these are still referred to as being part of the braking system.

The present invention therefore seeks to provide a more flexible and cost effective solution to the problems addressed by the known solutions.

According to the invention there is provided a connector in a trailer electronic braking and communication system for connecting the system to a prime mover, which connector comprises an electronic control module, which electronic control module is provided with a first databus connection, which databus, in use, carries braking related data signals and to which a brake pressure control device is attached and an optional second databus connection, which databus, in use, carries data relating to non-braking functions.

The invention provides an intelligent ISO7638 connector module.

The connector may be connected to the second databus connection. The connector may include a standards compliant braking related data connection and a second standards compliant data connection for data relating to non-braking functions. The first databus may be compliant with ISO7638 and the second databus is compliant with ISO 12098. The connection to the brake or brake and chassis controller may be made using a 4 wire cable. Each wire may have a diameter of approximately 1 mm. The speed of the data signals on at least one of the databuses may be 250 Kb/s or higher. The data relating to non braking functions may include at least one of lighting control, object detection, object location, object distance sensor and/or a video signal. A third databus connection may be provided, which databus carries data relating to at least one of object detection, object location, object distance sensor and/or a video signal.

According to a second aspect of the invention there is provided an intelligent lighting board for a trailer comprising an electronic control unit, which is electrically connected to at least one of a camera, radar detector or lidar detector or object detection sensor, location distance sensor, the electronic control unit being connected to a standards compliant connector in a trailer via a databus, wherein the electronic control unit is adapted to process data from the camera, radar detector or lidar detector before transmitting the data on the databus to the connector. It will be appreciated that the intelligent lighting board may alternatively consist of one or more intelligent light assemblies, each containing a plurality of lighting functions and with the sensor cluster collocated with the lighting functions. Such intelligent light assemblies may then be mounted the frame of the trailer to form a virtual intelligent lighting board, typically comprising two such assemblies.

The ISO7638 connector module and the ISO12098 connector module may be combined into one Trailer Power and Communication Module, providing the standardised electrical connections towards the towing vehicle, preferably having a combined power conditioning and controller arrangement, whereby the both the ISO11992-2 and ISO11992-3 CAN busses are processed. The Trailer Power and connector module provides two 4*1 mm connections for the trailer brake module and the light control board respectively. This provides the option to combine the power sources of ISO7638 and the ISO12098 to increase the availability of the brake module in the case of a failure of the prime mover. Furthermore, the information from the obstacle detection or rear view camera systems can be processed and if a reverse gear is selected the Trailer Power and Communication Module can apply the brakes of the trailer if an obstacle is detected.

Exemplary embodiments of the invention will now be described in greater detail with reference to the drawings.

DETAILED DESCRIPTION

Figure 1:
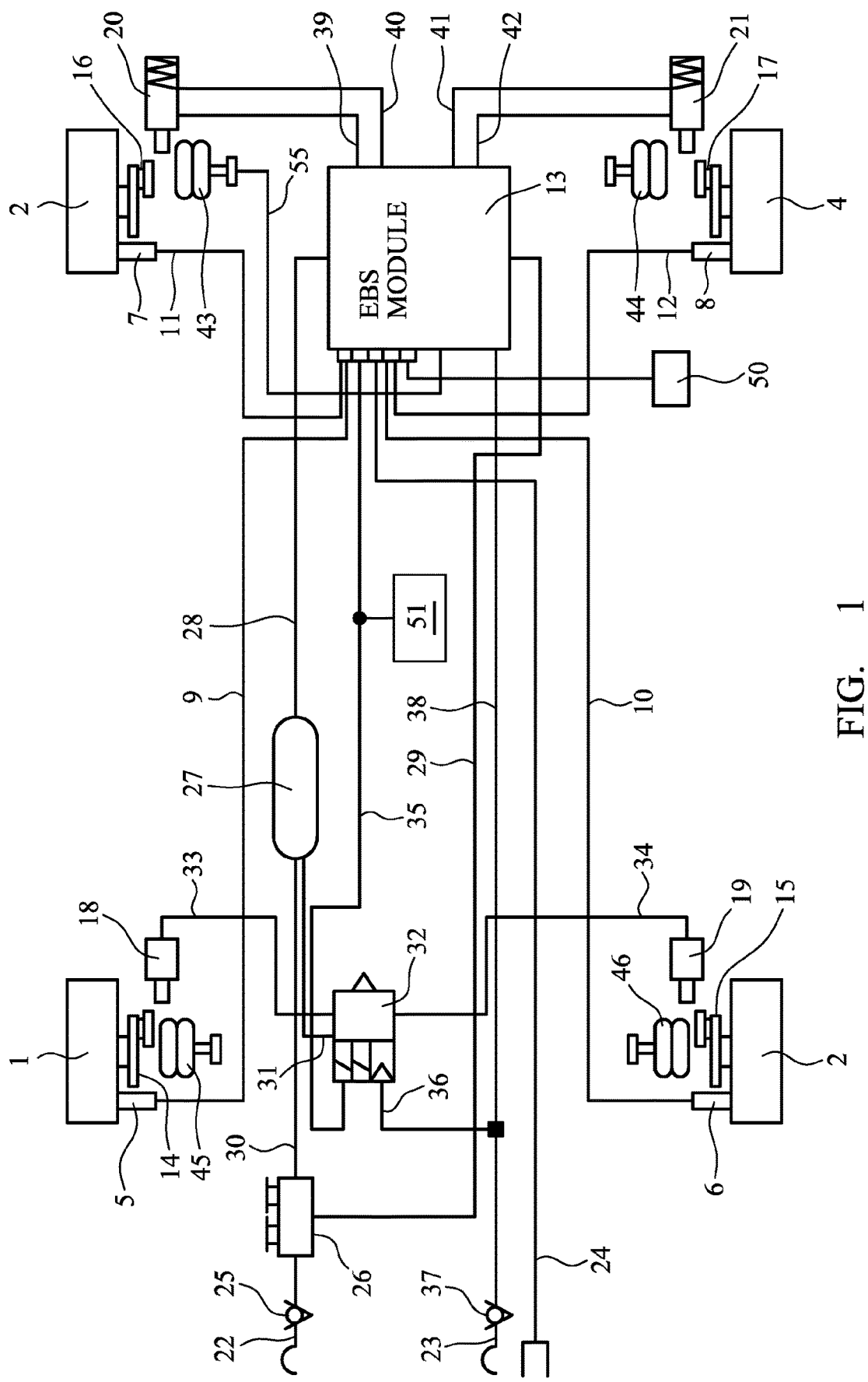
FIG. 1 shows a known trailer electronic braking system.

FIG. 1 shows a known trailer electronic braking system in which the utility vehicle trailer has a steerable front axle with front wheels 1, 2 and a rear axle with rear wheels 3, 4. Rotational wheel speed sensors 5-8 are in each case assigned to the front wheels 1, 2 and the rear wheels 3, 4, and are connected by way of electric lines 9-12 with an electropneumatic brake pressure control module 13 (EBS module) which is primarily assigned to the rear axle brakes. One brake 14-17 is in each case assigned to the front wheels 1, 2 and the rear wheels 3, 4, which brake 14-17 can be applied by brake cylinders 18, 19 of the front axle or spring-loaded brake cylinders 20, 21 of the rear axle.

The braking system of the trailer vehicle can be connected by way of three connections, specifically a pneumatic supply line connection 22, a pneumatic control line connection 23 and an electric control connection 24, with the braking system of a tractor or a further trailer. The electric control line 24 provides the ISO 11992 CAN data connection.

The supply line connection 22 is connected by way of a return valve 25 and a parking valve 26 with an air brake reservoir 27. From the air brake reservoir 27, a pneumatic line 28, 30 leads to a supply input of the pressure control module 13 and ABS valve 32. In addition, a pneumatic line 29 branches off the parking valve 26 to the pressure control module 13. A pneumatic line 30 extends between the parking valve 26 and the air brake reservoir 27.

The ABS valve 32 is assigned jointly to both brake cylinders 18, 19 of the front axle and is connected with the brake cylinder 18 by way of a pneumatic line 33 and with the brake cylinder 19 by way of a pneumatic line 34. The ABS valve 32 has two electric control inputs which are connected by way of "one" electric line 35 shown here only schematically with the pressure control module 13.

Furthermore, the ABS valve 32 has a pneumatic control input 36 which is connected by way of a return valve 37 with the pneumatic control connection 23. The pneumatic control input 36 is also connected by way of a pneumatic control line 38 with a pneumatic control input of the pressure control module 13. The pressure control module 13 has an integrated pressure sensor (not shown) which measures the pressure in the pneumatic control line 38, that is, the control pressure present at the pneumatic control input 36 of the ABS valve, which control pressure is identical to the maximal pressure which can be controlled into the brake cylinders 18, 19.

The pressure control module 13 has pneumatic outputs 39-42 which are connected by way of assigned pneumatic lines with the spring brake cylinders 20 or 21.

Furthermore, pneumatic axle load sensors or air bellows 43, 44 are provided at the rear axle and permit a determination of the axle load, particularly of the dynamic axle load during braking and starting. The axle load sensors or air bellows 43, 44 are connected by way of pneumatic lines with the pressure control module 13. Correspondingly the pressure in airbags 45, 46 provided at the front axle, which here are electrically controlled, may be detected by the transducer 47. However, the axle load sensors 45, 46 are not absolutely necessary.

To provide stability control a lateral acceleration sensor 50 is provided, which may also be integrated with a yaw sensor, and the output of the lateral acceleration sensor is fed to the pressure control module/ECU 13. Typically the lateral acceleration sensor 50 is integrated into the pressure control module/ECU 13. In the event that lateral acceleration on the trailer is detected, the pressure control module can provide for increased brake force at the front and/or rear axles. When the lateral acceleration sensor 50 detects lateral acceleration on the trailer in which it is installed, the sensor generates a signal setting the stability control to active.

With respect to the embodiment described to FIG. 1, the ABS valve 32 may be replaced with an electro-pneumatic valve where the electric control line 35 consists of a commutation arrangement, which may be a CAN and an electric power source.

The pressure control module 13 receives data from the wheel speed sensors on the trailer and also receives a signal indicating whether the brake pedal in the vehicle cab is depressed or not, as well as the brake pressure demand. In addition to the ISO 7638 electrical connection shown, trailers can also have an ISO 1185 electrical connection for supplying power to indicator lights and the trailer stop lights.

In a first embodiment of the braking system of the invention, the system is provided with the ISO 7638 and, optionally, ISO 1185 (or alternately ISO12098) connections being connected to an electronic control module. The electronic control module is located at the trailer headboard and receives the brake and running gear control signals from the Truck-Trailer CAN bus. The trailer electronic module is further connected to a first trailer brake CAN bus, to which the trailer brake module (equivalent to EBS module 13) is connected. The CAN bus comprises 4 1 mm$^2$ cross section wires. The trailer brake module is further connected to wheel speed sensors and Auxiliary I/O.

The electronic control module is further connected to a second trailer brake CAN bus, to which the Trailer Electronic Pressure Module is connected (equivalent to single channel brake module 32). The Trailer Electronic Pressure Module 306 receives inputs from the wheel sensors and Auxiliary I/O inputs. Although there are several variants of the Trailer Electronic Pressure Module, only one type will be fitted to a standard trailer.

The trailer is provided with an internal CAN bus, in particular a 5V CAN bus, to enable auxiliary devices or functions to be installed such as a trailer information module, tyre pressure monitoring system or trailer access point. The internal bus is connected to the trailer electronic pressure module.

The ISO 11992 standard defines a maximum speed on the bus at 125 Kb/s as the signal on that CAN bus has a range from 0 to the truck battery voltage. As trailers are disconnected and reconnected frequently, there is inevitably damage to the connectors resulting in attenuation of the voltage. On the known systems, a 5V CAN bus is unsuitable for connection to a truck due to this damage as the signal will be attenuated from too low a level to provide a reliable signal over the life time of the system.

The connection between the electronic control module and the module and is however permanent upon installation. The absence of any connection damage leads to much reduced signal attenuation on the CAN bus connections so the 5V CAN bus can be used. Moreover, the speed of the data signals on this CAN bus can also be increased to 250 Kb/s or higher, which in turn enables much more data to be placed on the CAN bus. This enables the introduction of further functionality on the trailer such as obstruction detection or lane control.

In an alternative and simpler arrangement to that just described the ISO 7638 and, optionally, ISO 1185 (or ISO12098) connections are connected to an electronic control module. The electronic control module is located at the trailer headboard and receives the ECU Talk control signals from the Truck-Trailer CAN bus. The trailer electronic module is further connected to a first trailer brake CAN bus, to which the trailer brake module (equivalent to EBS module 13) is connected. The trailer brake module is further connected to wheel speed sensors and Auxiliary I/O.

The trailer is provided with an internal CAN bus to enable auxiliary devices or functions to be installed such as a trailer information module, tyre pressure monitoring system or trailer access point. The trailer internal bus is connected to the electronic control module.

These arrangements reduce the cabling costs and simplify the fitting of the cables compared to the arrangement of FIG. 1 as the two thicker power cables of the 7 pin ISO7638 connection are no longer required. These are the more expensive and stiffer cables, costing around three times the price of the thinner cables and taking longer to install.

The electronic control module comprises a power management function, the CAN bus connections and the warning light circuit connection. The control logic for the trailer brake system is located in this module rather than in the brake control module. This has in turn several unexpected advantages in that power conditioning of the signals from the truck is not required and it is also possible to dispense with the corresponding safety components in the brake module. The brake module can thus be simplified to a pressure controller and I/O hub. This architecture also enables the Trailer Internal CAN to be separate from the Trailer Brake CAN, which enhances the safety of the brake function as there is no need to prioritise the brake data on the CAN bus.

The electronic control module is also able to condense data, which data is then passed over the bridge to the truck brake system without the need to modify the truck systems thereby ensuring good compatibility with the existing truck fleet. The trailer can thus have a high speed CAN bus, including CAN-FD, facilitating the introduction of lane control and autonomous driving.

Figure 2:
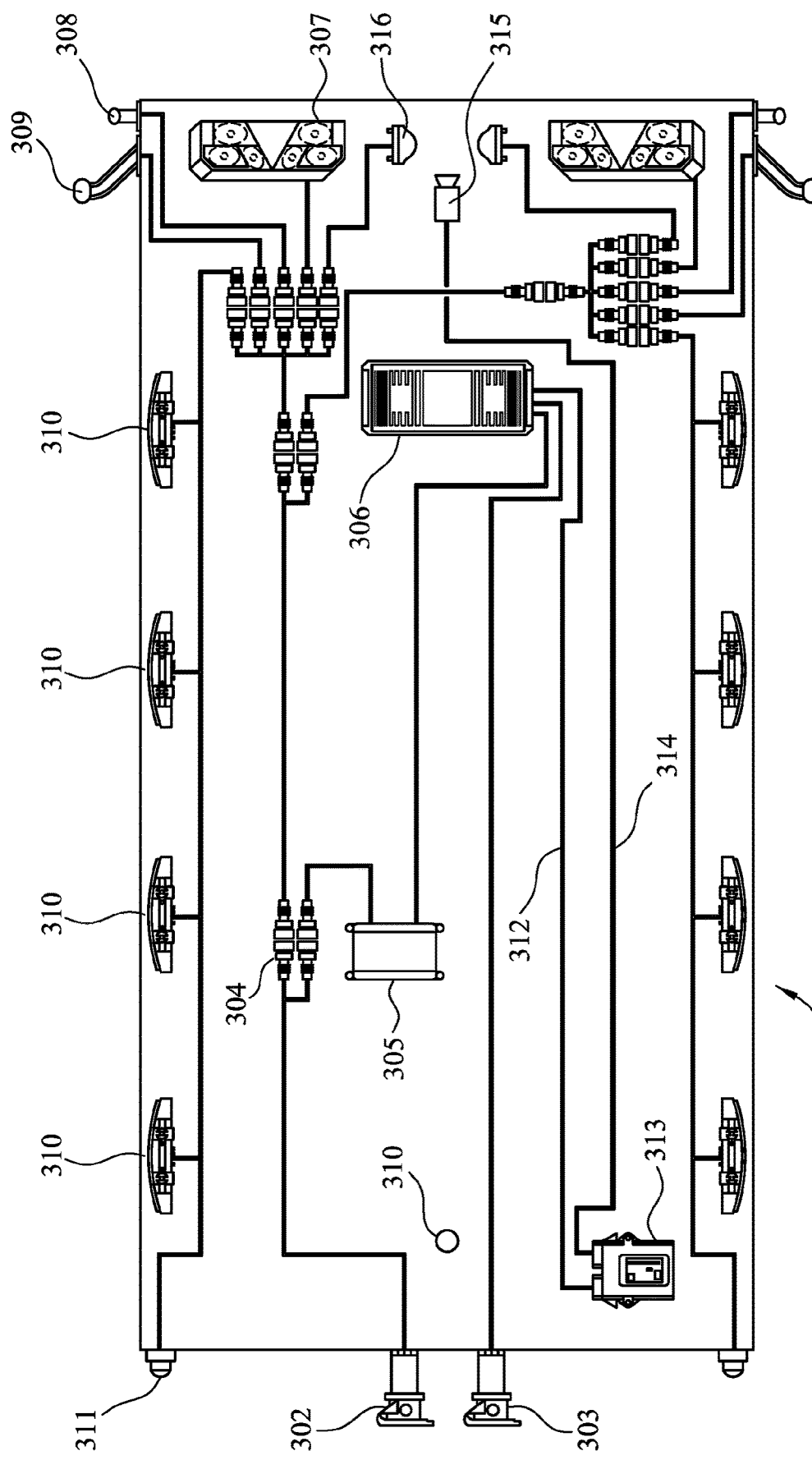
FIG. 2 shows schematically the electrical connections in a known braking system.

FIG. 2 shows a schematic representation of the electrical connections in a known trailer brake system in a trailer 300. The front end of the trailer, denoted by kingpin 301, is provided with a separate ISO 12098 connector 302 and ISO 7638 connector 303. The ISO 12098 connector 302 is connector via a splitter 304 to a wiring box 305, which is connected to the trailer EBS unit 306. The wiring box 305 provides the stop lamp power feed, which is used as a back up electrical power source for the EBS unit 306.

The splitter 304 also provides the electrical connection to the trailer lighting system. The trailer lighting system, which is symmetrically arranged on the trailer, comprises rear light clusters 307, which clusters include the brake, reversing and rear position lights, top 308 and bottom 309 rear outline marker lights, four side marker lights 310, a front marker light 311 and number plate lights 316.

The ISO 7638 connector 303 provides an electrical and CAN databus connection to the EBS unit 306. The EBS unit 306 is connected via a further electrical and databus connection 312 to a trailer access point unit 313 located at the front of the trailer. This trailer access point unit 313 is connected to a rearward facing camera 315 located at the rear of the trailer via a further connection 314.

Figure 3:
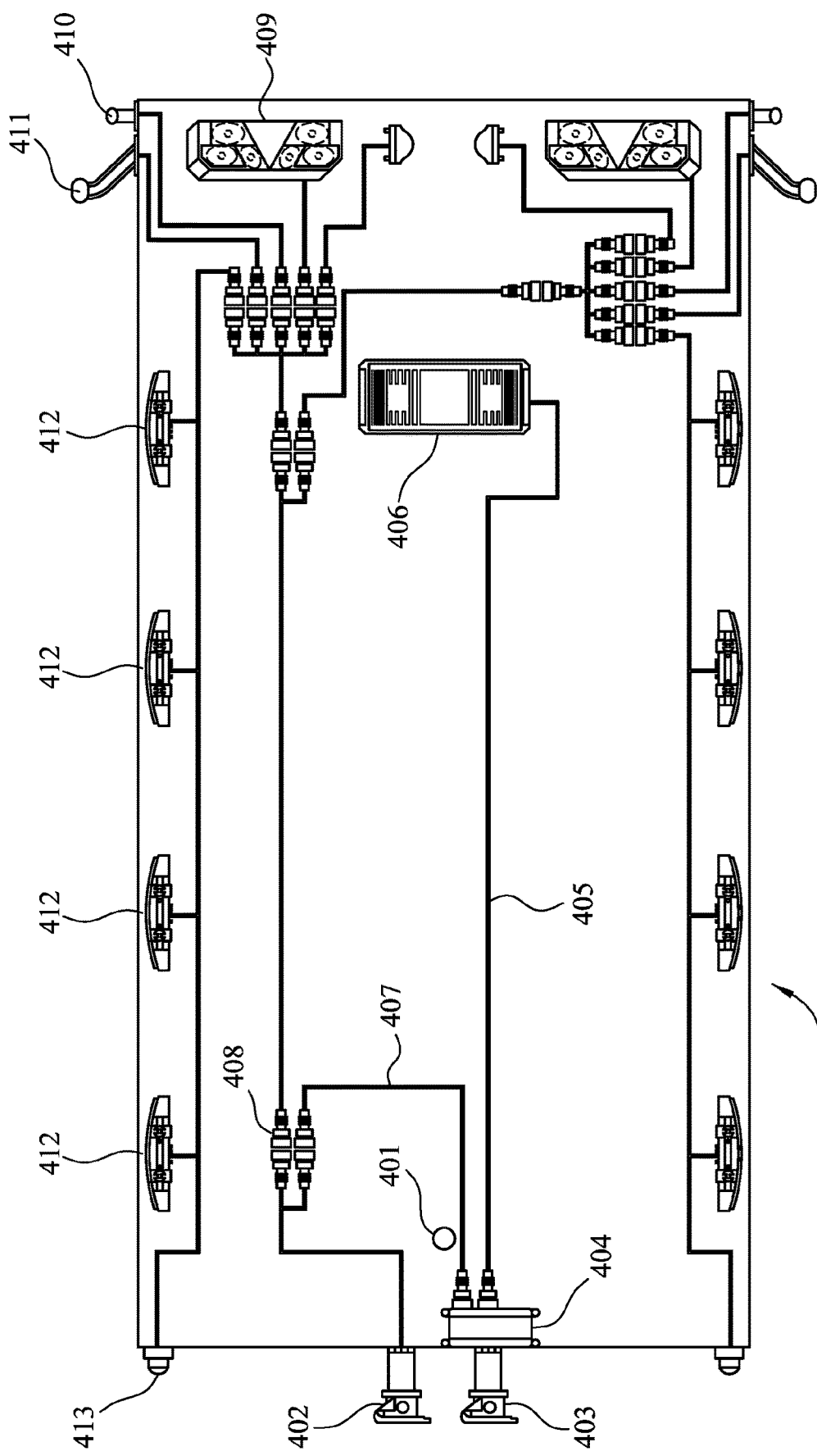
FIG. 3 shows schematically the electrical connection in an embodiment of the invention.

FIG. 3 shows a first embodiment of the invention in a trailer 400. The front end of the trailer, denoted by kingpin 401, is provided with a separate ISO 12098 connector 402 and ISO 7638 connector 403. The ISO 7638 connector 403 is provided with an electronic control unit 404. The electronic control unit 404 is connected by way of an electrical and CAN bus connection 405 to the trailer EBS 406 and by way of electrical connection 407 to a splitter 408, which is also connected to the ISO12098 connector 402 and which provides the connection to the trailer lighting system. The trailer lighting system The trailer lighting system, which is symmetrically arranged on the trailer, comprises rear light clusters 409, which clusters include the brake, reversing and night lights, top 410 and bottom 411 rear marker lights, four side marker lights 412 and a front marker light 413.

The concept of the invention provides an intelligent ISO7638 connector module, where the power management and power conditioning are undertaken in the connector module. The connection to the brake or brake and chassis controller is then made using a 4 wire cable (e.g. 4*1 mm). The main intelligence for the brake system can also reside in the connector module, which in turn enables simplification of the brake or brake chassis controller (eg a pressure controller, and IO hub). This in turn significantly reduces the cost of adapting a 2S/2M module to a 4S/3M module and also, additionally, for use in US/NAFTA markets as only a different connector is required rather than additionally a different brake or brake and chassis controller for markets based on European standards. The concept of the invention can also be applied to the ISO12098 connector as described below. The lighting signals are read in by a ISO12098 connector module, or decoded from the ISO11992-3 CAN bus. The trailer is provided with a rear light control board. The connection between the ISO12098 connector module and the rear light control board is then made using a 4 wire cable (e.g. 4*1 mm). The rear light control board decodes the CAN signals and provides activation of the individual lighting circuits. The main intelligence for the light control system can also reside in the connector module, which in turn enables simplification of the wiring. The light control board can be further extended with sensing technology such as obstacle detection or rear view camera systems, it will be appreciated that this data can also be transmitted back the connector module via the CAN bus.

The CAN bus can be either a CAN FD or normal CAN, or an alternative technology such as Ethernet, which is a 6 wire connection.

Figure 4:
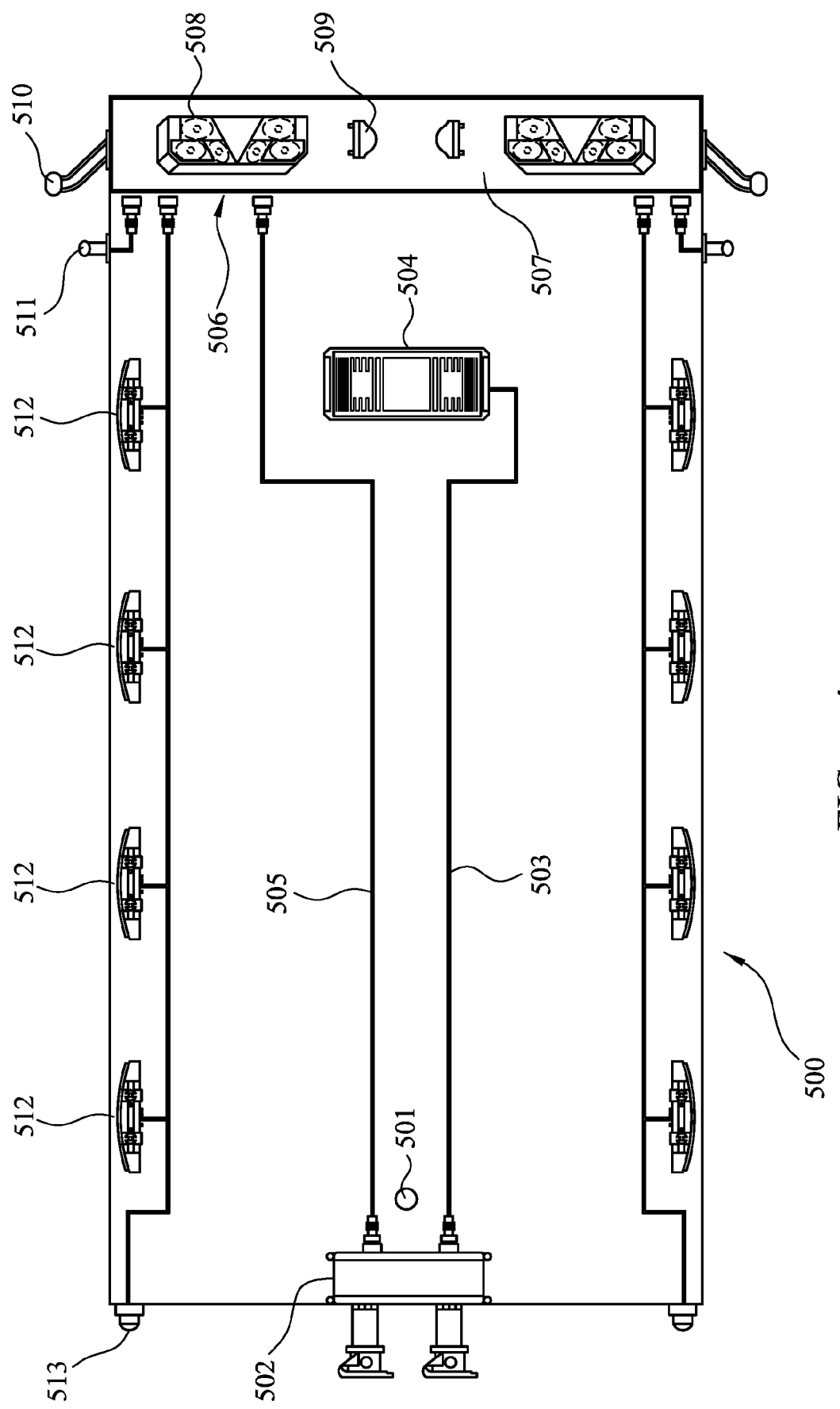
FIG. 4 shows schematically the electrical connection in a further embodiment of the invention.

FIG. 4 shows a second embodiment of the invention in a trailer 500. The front end of the trailer, denoted by kingpin 501, is provided with a combined ISO12098 and ISO7638 connector 502, which comprises an ECU. The connector ECU is provided with a first connection 503 to the trailer EBS 504 and a second connection 505 to the lighting system 506. The connections can be 2 power pins and a CAN connection or an Ethernet connection. On known systems, Ethernet is not useable due to the mechanical demands made on the system despite its potential for high data transfer rates. In embodiment of the invention, the mechanical demands are significantly reduced and so its use becomes technically feasible.

The trailer lighting system comprises a lighting board comprising an ECU 507. The lighting board is provided with rear light clusters 508, number plate lights 509 and bottom markers 510. These are arranged substantially symmetrically. Top rear markers 511 are connected to the board 507 via a first connection. The side marker lights 512 and front marker light 513 are connected to the board 508 via a second connection.

Figure 5:
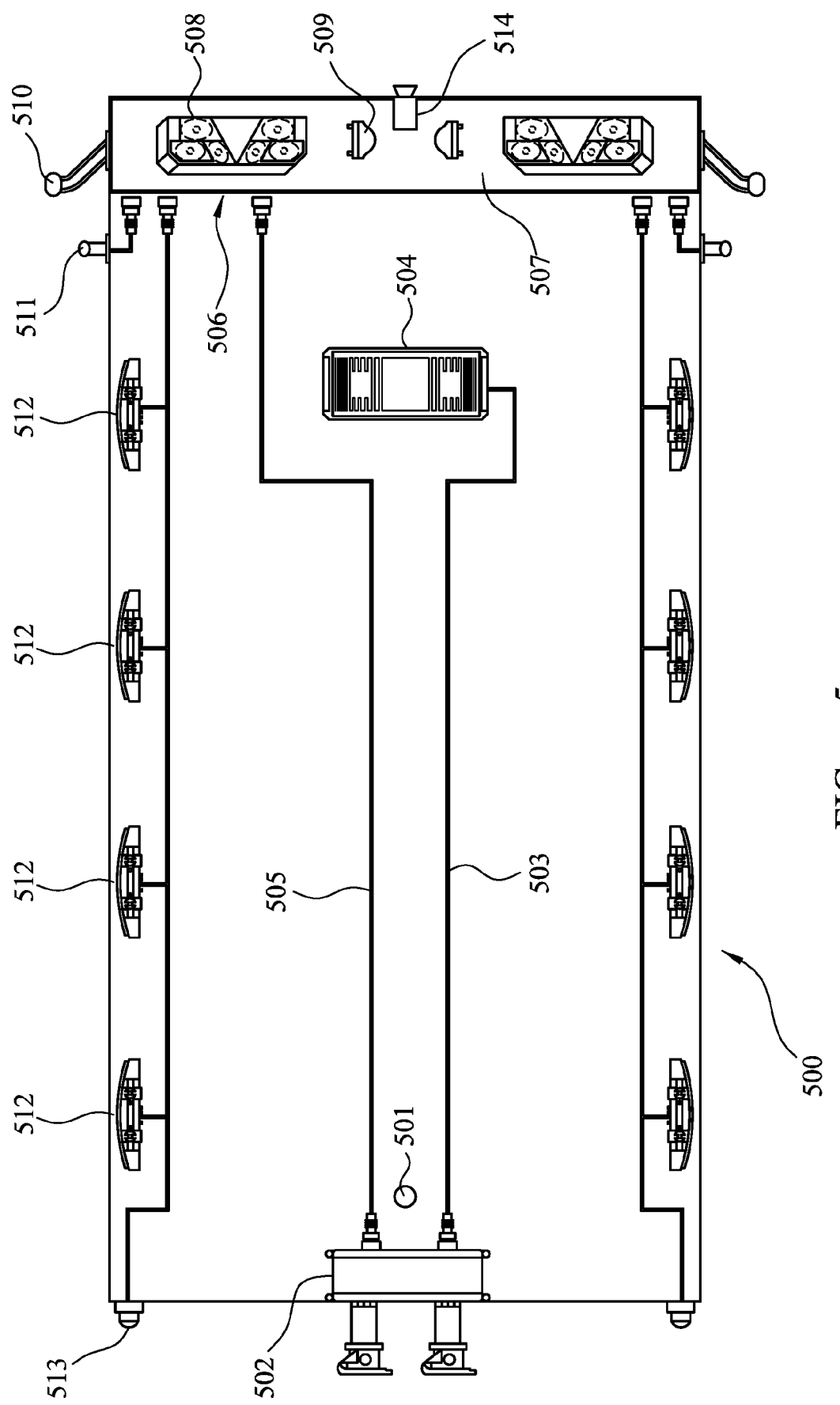
FIG. 5 shows schematically the electrical connection in a further embodiment of the invention.
Figure 6:
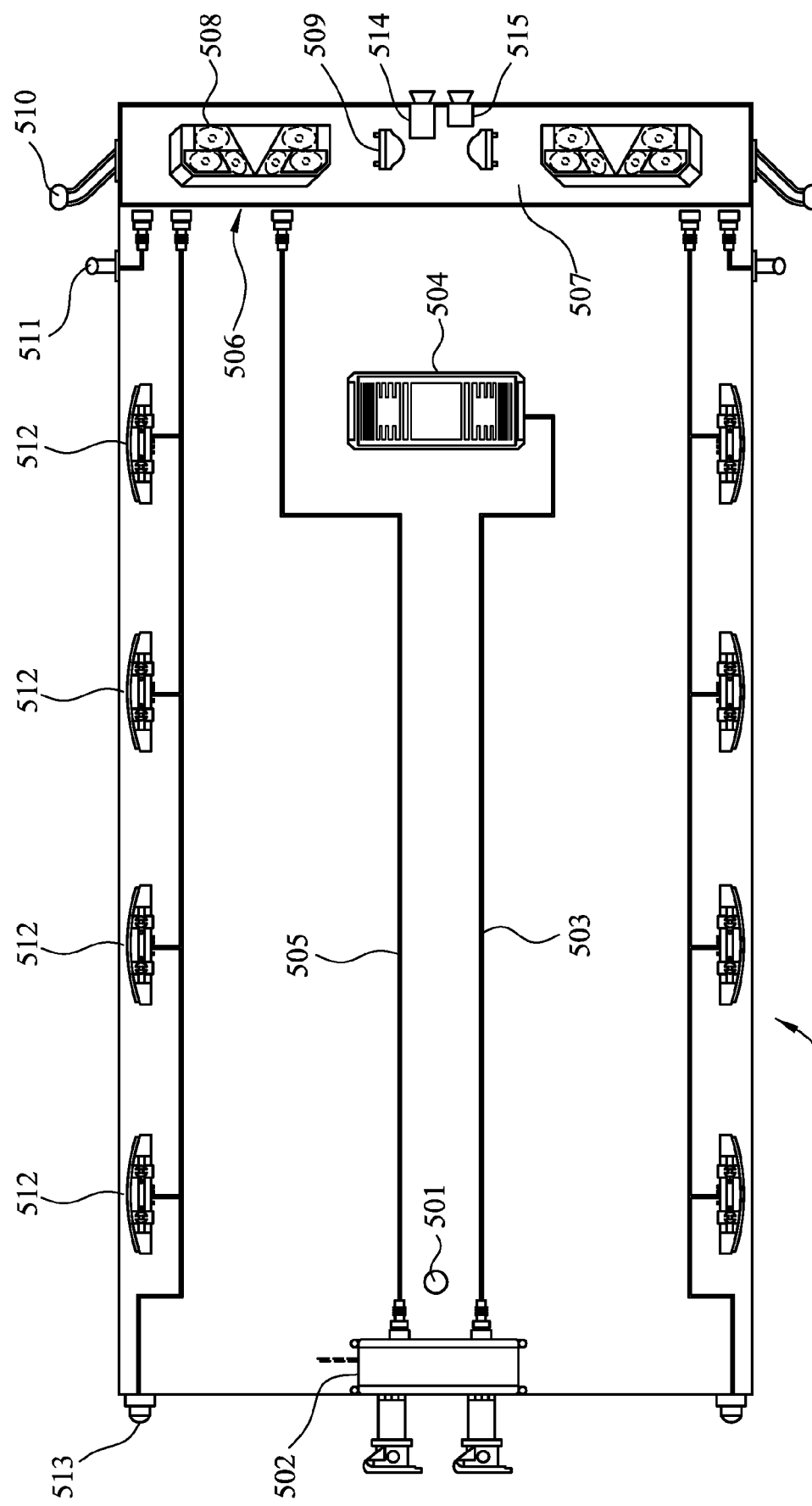
FIG. 6 shows schematically the electrical connection in a further embodiment of the invention.

FIG. 5 shows an alternative arrangement to the embodiment of FIG. 6, in which like numbers denote like parts. The lighting board 507 is provided with a rear facing camera 514.

FIG. 6 shows a further embodiment, in which like numbers denote like parts. The lighting board can be provided with object distance and/or location sensors such as a rear facing radar or lidar or other object sensor such as an ultrasonic sensor 515 or indeed the camera 514, which may provide object detection and location.

Figure 7:
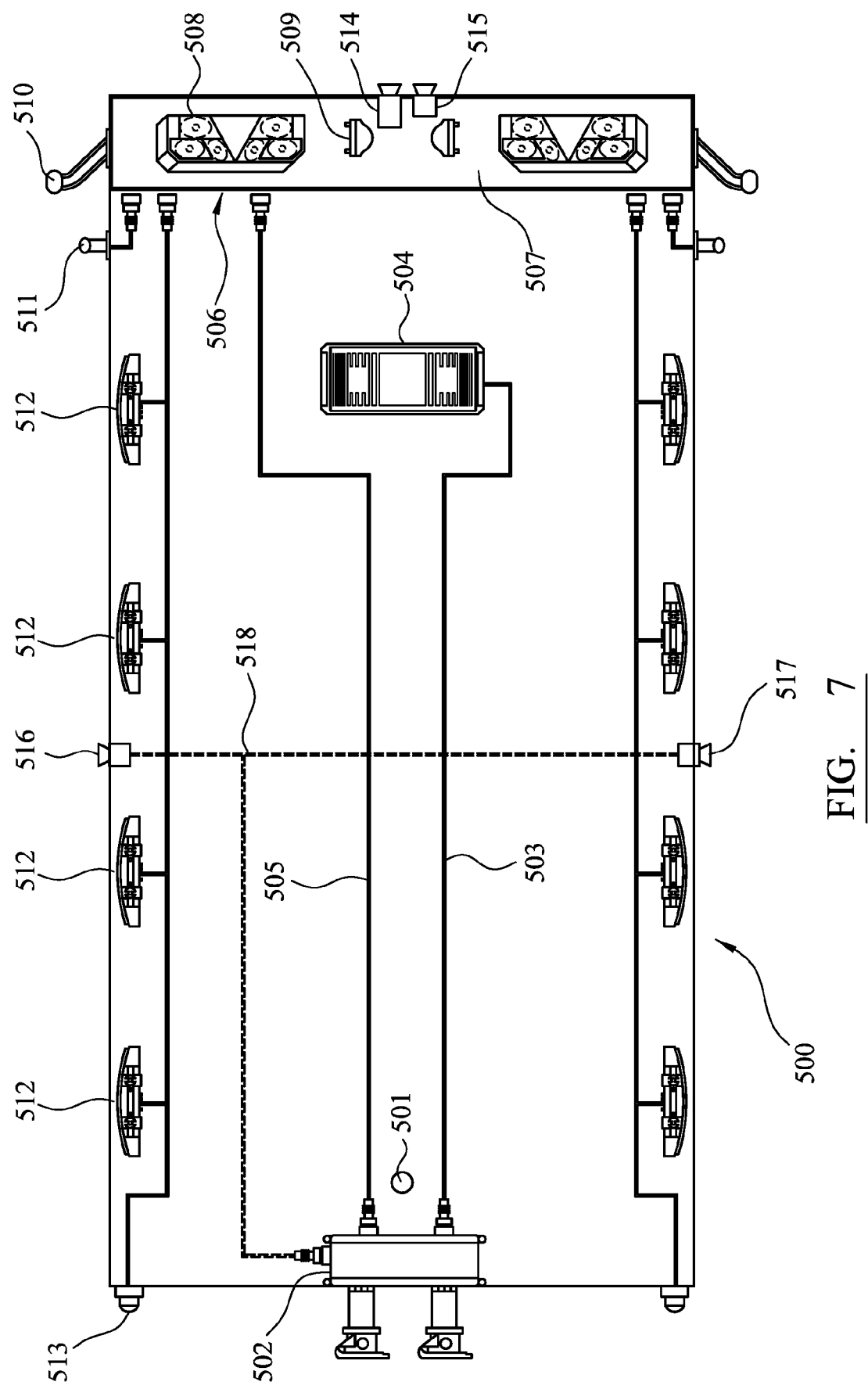
FIG. 7 shows schematically the electrical connection in a further embodiment of the invention

FIG. 7 shows a further embodiment including side facing radar or lidar 516 and 517, which are connected by way of an electrical connection 518 with the connector 502.

The embodiments of FIGS. 6 and 7 do not require any additional control units in contrast to the technical requirements to include radar in the known systems shown in FIG. 2. The cost of the additional ECU and cabling has made the introduction of these systems on trailers commercially unattractive for operators.

With the introduction of autonomous driving the number of required sensors on the trailer will increase, due to the large amounts of data required, the trailer systems will need to preprocess the sensor data before transmission to the prime mover. In will be appreciated that some of the sensors will be mounted on the light control board, whilst other will be mounted to the side of the trailer. The Trailer Power and Communication Module can be further extended to include a third 4*1 mm connection for powering and communication with these side mounted sensor arrays. The Trailer Power and Communication Module will then act as a combined brake, brake and chassis control, lighting and autonomous driving controller.

In the embodiments of FIGS. 3 to 7, it is possible to include the connections for auxiliary devices such as the trailer access point (eg iTAP®), GSM or GPS to the intelligent connector.

The approach of the invention is highly scalable as it can enable the use in the trailer of a more generic and lower cost truck brake control controller in a 2S/2M system. but can easily also be used in the more complex 4S/3M brake system arrangement by the addition of a single channel brake controller.

It would also be possible to use the connector described with respect to FIGS. 4 to 7 as a truck side connector. The truck side connector could then be connected to the trailer side connector either by way of a wired connection or wirelessly. In this application prime mover includes what are also referred to as trucks or tractors.

At this time, the standards in force are ISO 7638-2:2003 and ISO12098:2004.

The invention claimed is:

1. A connector system for providing data and power in a trailer having a commercial vehicle electronic braking and communication system, including a trailer EBS unit, comprising:
   an electrical control unit (ECU);
   a first connector positioned at the front end of the trailer;
   a second connector positioned at a front end of the trailer;
   wherein the ECU is connected by a first databus to the trailer EBS unit, wherein the first databus is configured to carry braking related data signals to the trailer EBS unit, and wherein the connector system is for connecting the vehicle electronic braking and communication system to a prime mover;
   wherein the second connector includes a second databus connection for a second databus to carry data relating to non-braking functions, wherein the second databus is separate from the first databus,
   wherein the ECU includes a smart connector module, and wherein the smart connector module is at least connected to and/or associated with the first connector,
   wherein the electronic braking and communication system includes at least object detector, which is connected to the second databus, and
   wherein the electronic braking and communication system acts as a combined brake, brake and chassis control, lighting and autonomous driving controller.

2. The connector system of claim 1, wherein the first connector includes a standards compliant braking related data connector, wherein the second connector includes a second standards compliant data connector for data relating to non-braking functions, and wherein the first and second connectors are both connected to and/or associated with the ECU is.

3. The connector of claim 1, wherein the first connector includes a standards compliant braking related data connector having the ECU, and wherein the second connector includes a second standards compliant data connector for data relating to non-braking functions.

4. The connector system of claim 1, wherein the first databus is compliant with ISO7638.

5. The connector system of claim 4, wherein the second databus is compliant with ISO 12098.

6. The connector system of claim 1, wherein the connection to the brake or brake and chassis controller is made using a 4 wire cable.

7. The connector system of claim 6, wherein each wire of the 4-wire cable has a diameter of approximately 1 mm.

8. The connector system of claim 1, wherein the speed of the data signals on at least one of the databuses is 250 Kb/s or higher.

9. The connector system of claim 1, wherein the first databus includes an Ethernet connection.

10. The connector system of claim 1, wherein the data relating to non-braking functions includes at least one of lighting control, object detection, object location, object distance and/or a video signal.

11. The connector system of claim 10, wherein the ECU is configured to determine if an obstacle is present and, in the event of an obstacle being detected, generate a brake actuation signal.

12. The connector system of claim 1, wherein there is a third databus connection for a third data bus to carry data relating to at least one of object detection, object location, object distance and/or a video signal.

13. The connector system of claim 1, wherein the electronic braking and communication system includes a camera, which camera is connected to the second databus.

14. The connector system of claim 1, wherein the at least object detector includes at least one of: a radar; a lidar and/or an ultrasonic detector.

15. The connector system of claim 1, wherein power management and power conditioning are performed in at least the first connector.

16. The connector system of claim 1, wherein the first connector is connected to a splitter.

17. The connector system of claim 16, wherein the ECU is also connected by an electrical connection to the splitter.

* * * * *